(12) United States Patent
Niles

(10) Patent No.: US 9,431,157 B2
(45) Date of Patent: Aug. 30, 2016

(54) CONDUCTOR COVER APPLICATOR WITH SPOOL

(71) Applicant: Cantega Technologies Inc., Edmonton (CA)

(72) Inventor: Martin Niles, Stony Plain (CA)

(73) Assignee: Cantega Technologies, Edmonton, Alberta (CA)

( * ) Notice: Subject to any disclaimer, the term of this patent is extended or adjusted under 35 U.S.C. 154(b) by 226 days.

(21) Appl. No.: 14/159,241

(22) Filed: Jan. 20, 2014

(65) Prior Publication Data

US 2014/0202610 A1 Jul. 24, 2014

Related U.S. Application Data

(60) Provisional application No. 61/754,451, filed on Jan. 18, 2013.

(51) Int. Cl.
*H01B 13/06* (2006.01)
*H02G 1/02* (2006.01)
*H02G 3/04* (2006.01)
*H02G 7/00* (2006.01)

(52) U.S. Cl.
CPC ............... *H01B 13/06* (2013.01); *H02G 1/02* (2013.01); *H02G 3/0406* (2013.01); *H02G 7/00* (2013.01)

(58) Field of Classification Search
USPC ........................................................ 174/5 R
See application file for complete search history.

(56) References Cited

U.S. PATENT DOCUMENTS

| | | | |
|---|---|---|---|
| 1,485,994 A | 3/1924 | Salisbury | |
| 3,017,905 A | 1/1962 | Klein | |
| 3,133,984 A | 5/1964 | Berwick et al. | |
| 3,600,784 A | 8/1971 | Neagle et al. | |
| 3,712,261 A * | 1/1973 | McLelland | B63B 21/663 114/243 |
| 3,900,698 A | 8/1975 | Yotsugi | |
| 5,796,032 A | 8/1998 | Hadley | |
| 6,195,861 B1 * | 3/2001 | Frye | H02G 1/04 174/5 R |
| 6,227,251 B1 | 5/2001 | Ahn et al. | |
| 6,730,852 B1 | 5/2004 | Puigcerver et al. | |
| 8,621,735 B2 | 1/2014 | Niles et al. | |
| 2011/0083783 A1 | 4/2011 | Niles et al. | |

OTHER PUBLICATIONS

Salisbury Insulation Covers—STINGER Covers, catalog, published as early as Nov. 21, 2008, 2 pages.
Salisbury Outage Protection, brochure, published at least as early as Nov. 21, 2008, 32 pages.
Salisbury product catalog, published at least as early as Nov. 21, 2008, 142 pages.
PCT international search report for International application No. PCT/CA2010/001590, received Feb. 8, 2011, 7 pages.

(Continued)

*Primary Examiner* — Jeff Aftergut
(74) *Attorney, Agent, or Firm* — Anthony R. Lambert

(57) ABSTRACT

Applicators and methods for applying a conductor cover to a cable, the conductor cover being tubular and split longitudinally to define a first longitudinal edge and a second longitudinal edge. The applicator comprises: a structural element; a spool connected to rotate relative to the structural element, the spool being sized to store the conductor cover in a pre-application state where the conductor cover is wrapped one or more times around the spool with the first longitudinal edge and the second longitudinal edge of the conductor cover spread open and perpendicular to a spool axis; and a lock for holding the conductor cover in the pre-application state.

24 Claims, 8 Drawing Sheets

(56) References Cited

OTHER PUBLICATIONS

Hubbell Power Systems Grip-All Clampsticks, catalog, Aug. 2009, 1 page.
Salisbury Universal Hotstick Applicator and Instant Insulation, URL=http://www.salisburybyhoneywell.com/en-US/Pages/Product.aspx?category=Instant%20Insulation&cat=HLS-HES&pid=Instant_insulation_applicator, accessed on Dec. 4, 2012, 1 page.
Distribution Industrielle GC, Spring clamp with hot stick installation eyes for isolating blanket, URL=https://www.distgc.com/product.php?ProductID=2082&UILanguage=EN, believed to be available at least before Jan. 20, 2014, 2 pages.

* cited by examiner

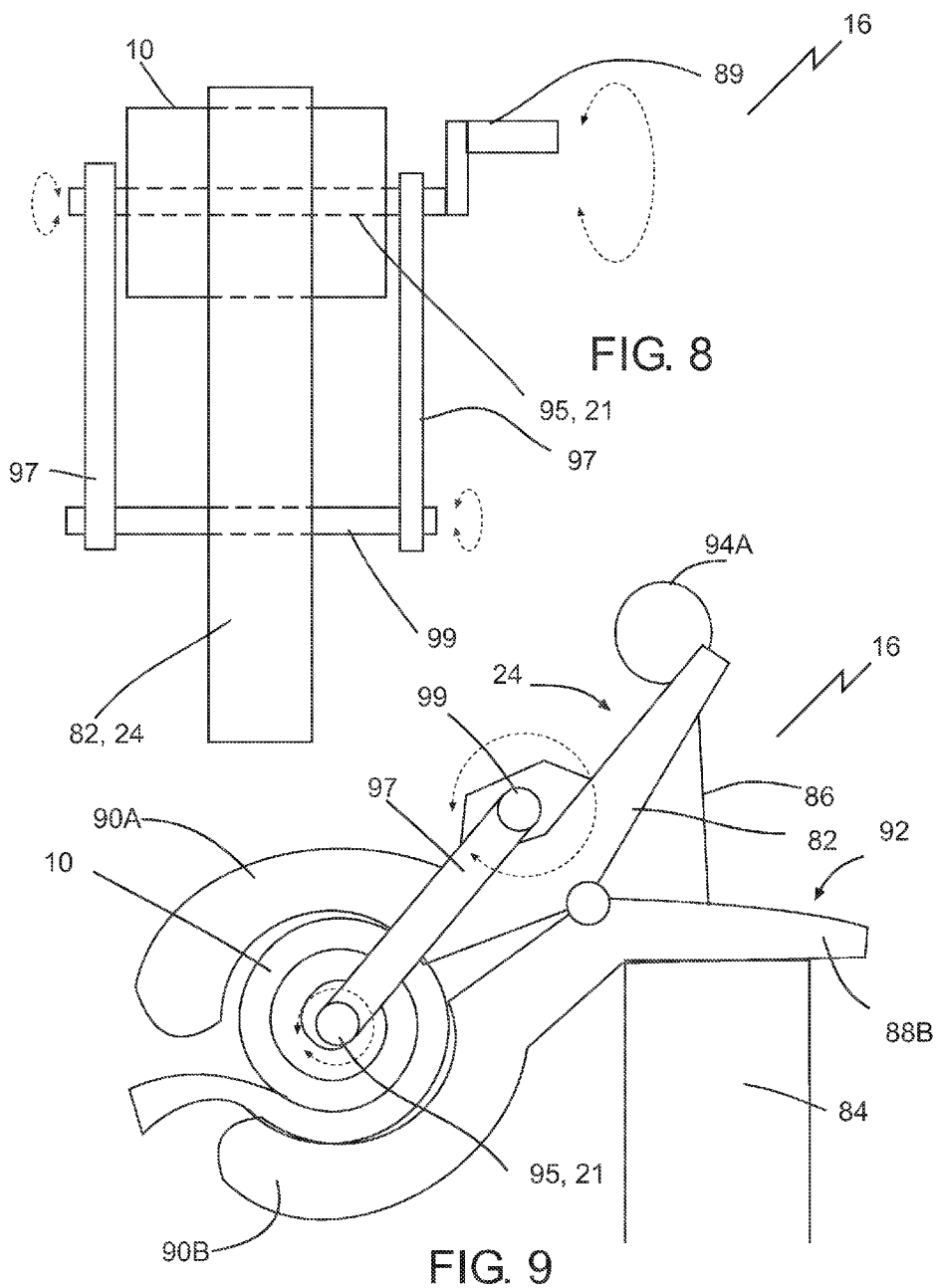

CONDUCTOR COVER APPLICATOR WITH SPOOL

TECHNICAL FIELD

This document relates to conductor cover applicators with spools.

BACKGROUND

Insulated conductor cover may be installed over cables in order to protect energized cables from wildlife and other incidental contact that may cause power system faults or outages. Conductor covers such as INSTANT INSULATION™ or STINGER COVER™ sold by SALISBURY™ are examples of the type of cover used in the industry for this purpose. There are three basic work methods for applying conductor cover: application to a grounded (de-energized) system; application by a worker using rubber gloves to apply the conductor cover to a system that could be energized or de-energized; and application by a worker using a hotstick to apply the conductor cover to an energized or de-energized system (for example, Canadian patent application no. 2,776, 227).

One type of applicator used in the industry for applying such cover on energized conductor is the 2494 universal hotstick applicator sold by SALISBURY™ of Boilingbrook, Ill. The 2494 applicator has two rigid closely-parallel prongs attached to one another at both ends. To install the conductor cover on a cable, one end of the Instant Insulation or other conductor cover is first flattened and inserted in between the applicator prongs. The prongs are then rolled to coil the insulation around the prongs. The prongs hold the cover flat, and a user can then place the flattened cover over a cable by unrolling the cover onto the cable.

SUMMARY

An applicator for applying a conductor cover to a cable, the conductor cover being tubular and split longitudinally to define a first longitudinal edge and a second longitudinal edge, the applicator comprising: a structural element; a spool connected to rotate relative to the structural element, the spool being sized to store the conductor cover in a pre-application state where the conductor cover is wrapped one or more times around the spool with the first longitudinal edge and the second longitudinal edge of the conductor cover spread open and perpendicular to a spool axis; and a lock for holding the conductor cover in the pre-application state.

A method of applying conductor cover to a cable, the conductor cover being tubular and split longitudinally to define a first longitudinal edge and a second longitudinal edge, the method comprising: positioning a spool adjacent the cable, the spool containing conductor cover locked in a pre-application state where the conductor cover is wrapped one or more times around the spool with the first longitudinal edge and the second longitudinal edge of the conductor cover spread open and perpendicular to a spool axis; unlocking the conductor cover; and applying the conductor cover to the cable by rotating the spool relative to a structural element connected to the spool.

An applicator for applying a conductor cover to a cable, the conductor cover being tubular and split longitudinally to define a first longitudinal edge and a second longitudinal edge, the applicator comprising: a spool sized to store the conductor cover in a pre-application state where the conductor cover is wrapped one or more times around the spool with the first longitudinal edge and the second longitudinal edge of the conductor cover spread open and perpendicular to a spool axis; a hot stick connected to the spool; a lock for holding the conductor cover in the pre-application state; and an actuator connected to operate the lock from a user end of the hot stick.

A conductor cover applicator comprises: a structural element; a spool connected to rotate relative to the structural element; and a lock for holding the conductor cover in a pre-application state on the spool.

A conductor cover applicator comprising: a spool; a hot stick connected to the spool; a lock for holding conductor cover in a pre-application state on the spool; and an actuator connected to operate the lock from a user end of the hot stick.

In various embodiments, there may be included any one or more of the following features: The structural element comprises a hot stick adapter. A hot stick, such as a grip-all clampstick, is connected to the hot stick adapter. The structural element comprises a hot stick. An actuator is connected to operate the lock from a user end of the hot stick. A drive system is connected to rotate the spool relative to the hot stick. A brake is between the spool and the structural element for partially inhibiting relative rotation. The brake is adapted to prevent the spool from free-wheeling on only energy stored in the conductor cover when in the pre-application state. The structural element comprises a flanged spool axle, the brake comprises a nut on the flanged spool axle, and the spool is compressed or elongated by the flanged spool axle and the nut. The spool is connected to articulate relative to the hot stick. A ball joint is between the spool and the hot stick. The lock is mounted on the structural element. The lock comprises a clamp adapted to be independently operated by a hot stick. The lock comprises a gripper plate with a width, parallel to the spool axis in use, sufficient to restrict premature curling of the first longitudinal edge and the second longitudinal edge. The applicator is constructed at least in part with dielectric material. Conductor cover is wrapped around the spool and locked in the pre-application state. An exterior surface of the conductor cover faces the spool. The cable is part of an energized electrical power transmission system, and the spool is positioned, unlocked, and applied at least partially within a safe Limit of Approach by a user who is outside the safe Limit of Approach. The conductor cover is locked using a clamp, and unlocking further comprises removing the clamp with a second hot stick. Unlocking comprises unlocking a lock by operating an actuator from a user end of the hot stick.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 1A is side elevation view of the applicator of FIG. 1 without conductor cover and illustrating the spool axle with dashed lines.

FIGS. 8 and 9 are top plan and side elevation views of another embodiment of a conductor cover applicator.

DETAILED DESCRIPTION

Figure 1:
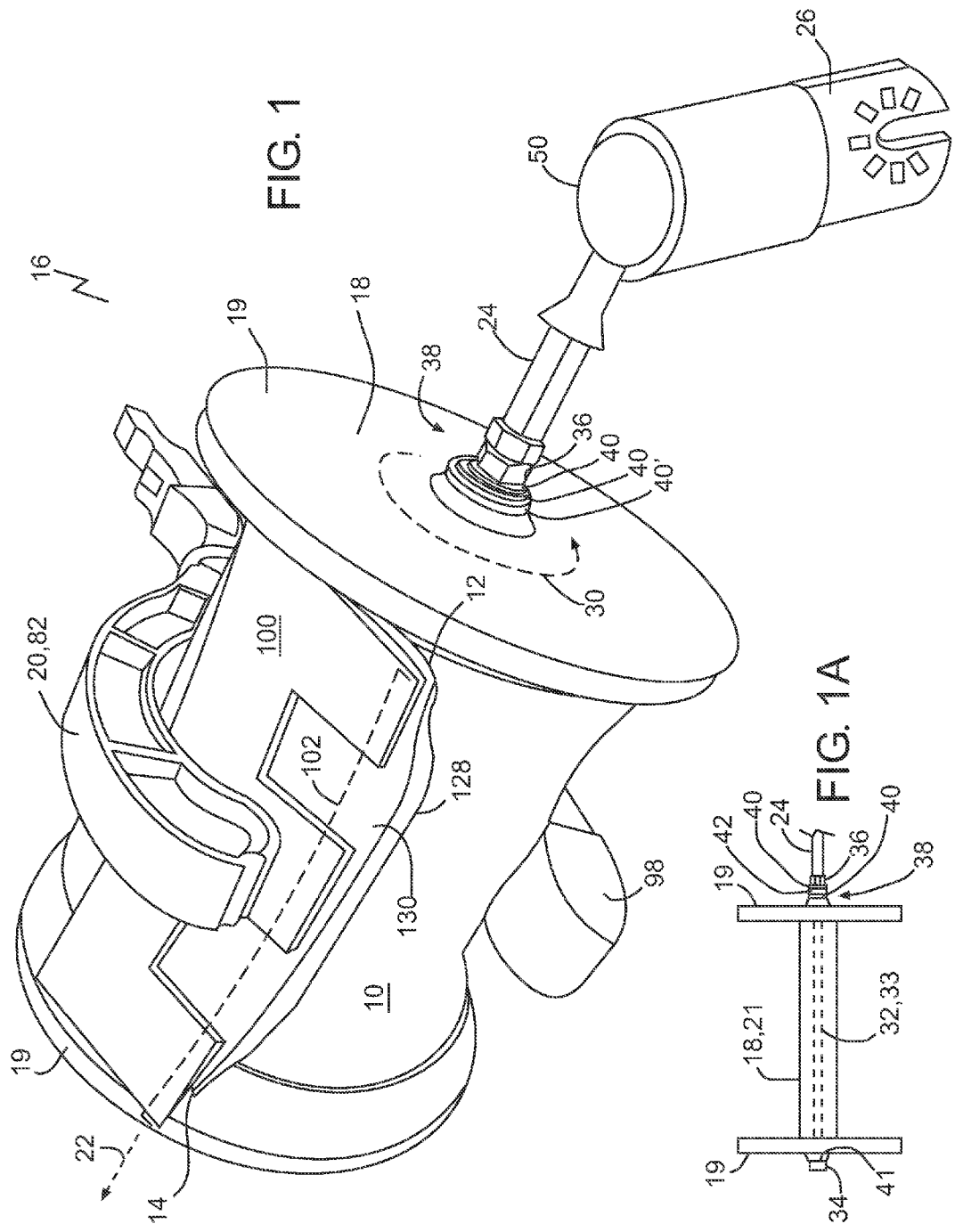
FIG. 1 is a perspective view of a conductor cover applicator with a clamp locking the tubular conductor cover in a pre-application state.

Immaterial modifications may be made to the embodiments described here without departing from what is covered by the claims.

Electric poles, towers, and other electrical equipment including substations may have various conductors, such as cables, that provide attractive resting places for birds, particularly in treeless regions. If the appendages of a bird or animal simultaneously contact a conductor and another energized object such as an adjacent conductor or a grounded structure such as a support tower or tree, the resulting electrical short-circuit can kill the bird or animal and also damage the power system. The electrical short can further cause electrical system damage resulting in power outages. Further, the presence of birds on cables in electrical systems increases the risk that predators will be attracted to the system and cause a power fault or outage. Predators can be mammals such as raccoons or cats, birds such as magpies, or snakes.

Substations transform power from transmission voltages to distribution voltages, typically ranging from 2400 volts to 37,500 volts. Distribution voltages allow for reduced system clearances. These reduced clearances between phases to ground and phase to phase, increase station susceptibility to bird or animal caused outages. Faults caused by birds and other animals often trigger sensitive relay protection schemes, resulting in substation lockouts, interrupting service to thousands or possibly tens of thousands of customers and at the same time damaging expensive substation equipment.

Components such as conductors, equipment, or support structures, in electrical power systems, may be protected from intrusion, occupation, or contact by birds and other animals. There are a variety of proposed solutions for repelling birds and other animals from electrocution risks. The inventor's own prior patent document discloses protectors for components of electrical power transmission systems, see United States patent publication no. 20080123254, as well as methods of making such protectors. However, in order to install such protectors, a power-down of the electrical system may be required, which adds to the cost of protecting the electrical equipment.

Power downs for the purpose of measuring or installing electrical equipment for protective covers can keep a system down for a half a day or longer time period, at great cost. Some systems are operated under the direction of a regulatory and scheduling authority that controls the system's downtime scheduling. In locations with minimal spare power transmission capacity, it can be a challenge for a system to get the downtime needed to access its equipment. Because electrical systems are usually scheduled for maintenance downtime on a fairly short notice (typically a week for non-emergency situations), and because scheduled downtime may be cancelled by the Regulatory Authority on an extremely short notice, there is no guarantee that personnel will be available to install the required component during a system's available downtime period. As a result, a system can experience significant delays in protecting their equipment.

Tubular conductor covers, such as resilient conductor covers, may be applied to electric cables as a permanent cover to protect against outages caused by weather, trees and animals. Conductor covers typically resist ozone and ultraviolet deterioration, while remaining flexible even at low temperatures. Conductor covers may be made from resilient material, in order to stay firmly wrapped around an energized cable after application and to assume a tubular conformation in the lowest energy state of the cover. Conductor covers are made from, for example, SALCOR elastomer, silicon rubber tubing, or other polymeric material. Conductor covers are dielectrics that act as a barrier to prevent the inadvertent transfer of electrical energy from the cable.

Figure 7:
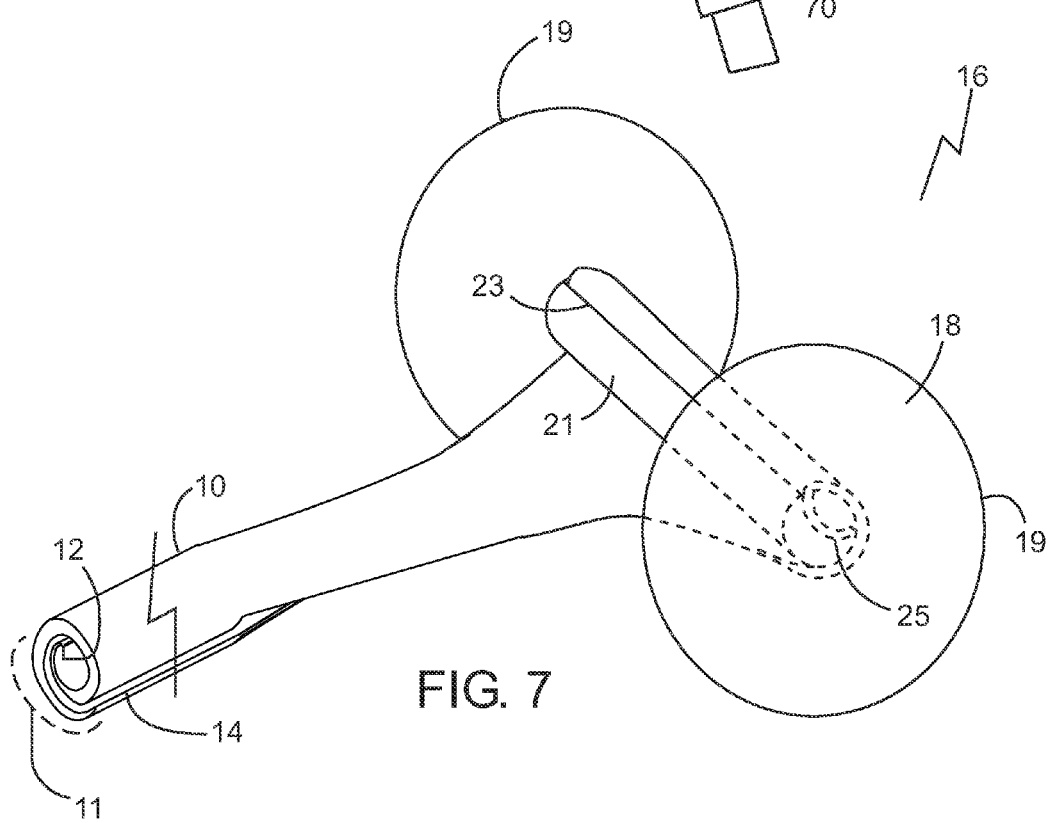
FIG. 7 is a perspective view illustrating tubular conductor cover being loaded into the pre-application state upon a spool.

FIG. 7 illustrates conductor cover 10. Cover 10 is tubular, and split longitudinally to form an overlapping portion 11 defined by longitudinal edges 12 and 14. This type of cover 10 can be installed and secured with zero or very little extra fastening, since the natural resiliency of the cover 10 ensures a tubular conformation when applied, and the overlapping portion 11 is adapted to reduce the possibility of electrical creepage from edge 12 to edge 14 to a safe level. Another type of cover (not shown), may be a regular tube of material sliced longitudinally and radially down the side such that first and second longitudinal ends 12 and 14 contact one another. Other cover types may be used with the applicators and methods disclosed herein, including heavy and light duty cover. Also, this document should not be limited to conductor cover brands or materials of construction presently on the market. With some types of cover, tape and/or tie wraps may be required as a fastener to secure the cover in place after application.

Figure 4:
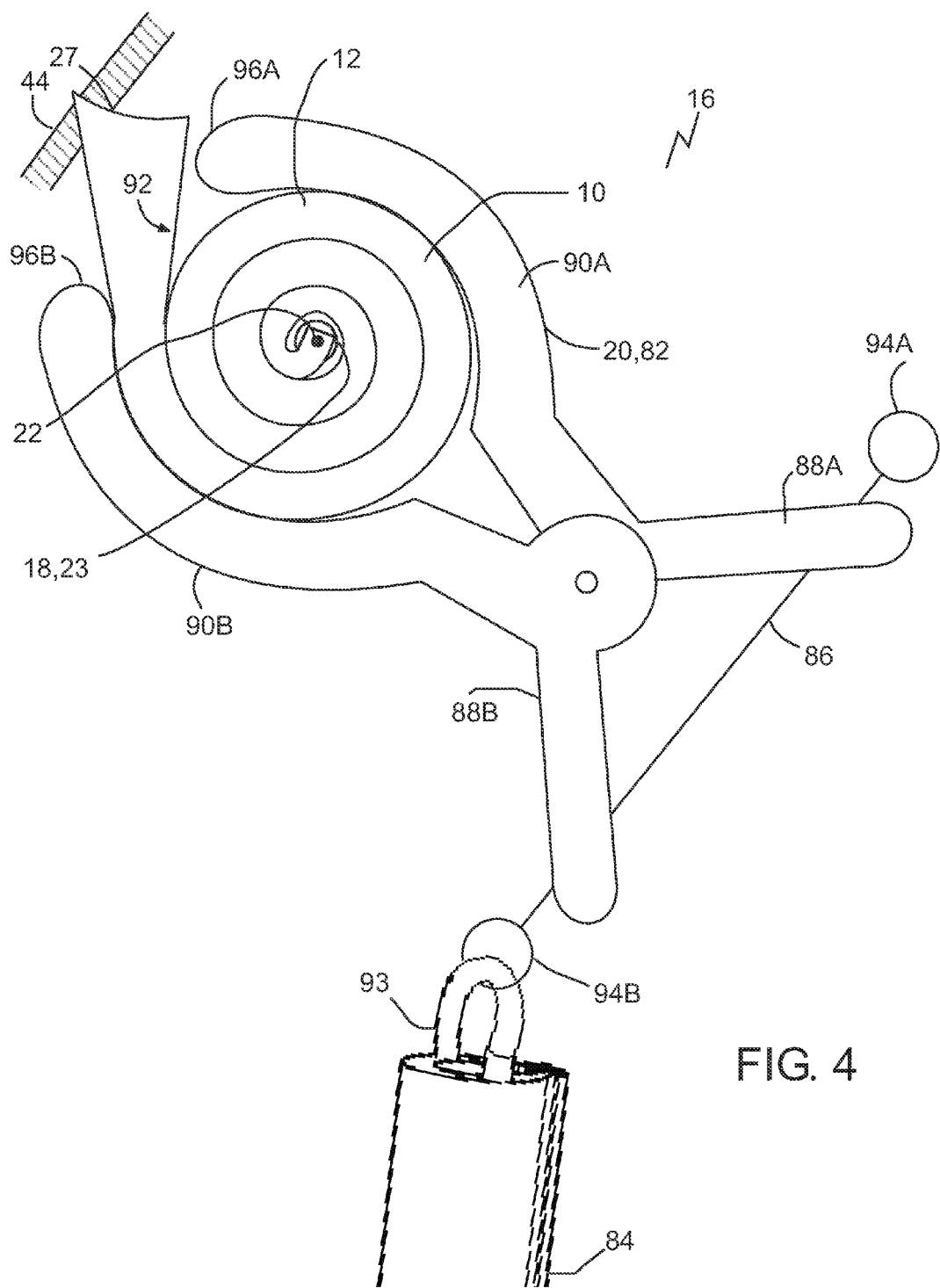
FIG. 4 is a side elevation view of the clamp and spool of the conductor cover applicator of FIG. 1.

Referring to FIGS. 1, 4, 5, and 7 an applicator 16 for conductor cover 10 is illustrated. Applicator 16 comprises a spool 18 and a lock 20 (FIGS. 1 and 4). Spool 18 is sized to store the conductor cover 10 in a pre-application state as shown. In the pre-application state, the conductor cover 10 is wrapped one or more times, in this case three and a half times, around the spool 18. In addition, the first longitudinal edge 12 and the second longitudinal edge 14 of the conductor cover 10 are spread open, for example at least partially flattened as shown, with the edges 12 and 14 lying perpendicular to a spool axis 22. Spool 18 may have one or more flanged ends 19 separated by a spool body 21, which receives the cover 10 (FIG. 7). Spool body 21 may be at least partially cylindrical as shown, and may include one or more longitudinal slots 23 for fitting an axial end 25 of cover 10 to allow spooling to begin (FIGS. 4 and 7). Other suitable mechanisms for retaining axial end 25 may be used, for example, clamping, locking, and friction fitting mechanisms. Slot 23 is advantageous because it allows axial end 25 to release from spool 18 when cover 10 is fully unloaded off of spool 18. A drive system (not shown) may be used to load cover 10 on spool 18. For example, the axle 32 may have a drill bit attachment for a conventional drill.

Applicator 16 may comprise one or more structural elements 24, which may include a hot stick adapter 26 (FIG. 1).

Adapter 26 may be a universal hot stick adapter, such as a tie stick adapter as shown, or may be another suitable adapter with a mechanism for connecting to the hot stick 28. Adapter 26 may be connected to a hot stick 28 (FIG. 5), or structural element 24 may include a hot stick 28 (FIG. 6). Hot stick 28 is made at least partially of a dielectric material. For energized application, described further below, the hot stick 28 may comprise a rated dielectric material that has passed an industry standard test. In some embodiments, the entire hot stick 28 is a dielectric shaft. In some cases applicator 16 may be constructed at least in part with dielectric material.

Figure 2:
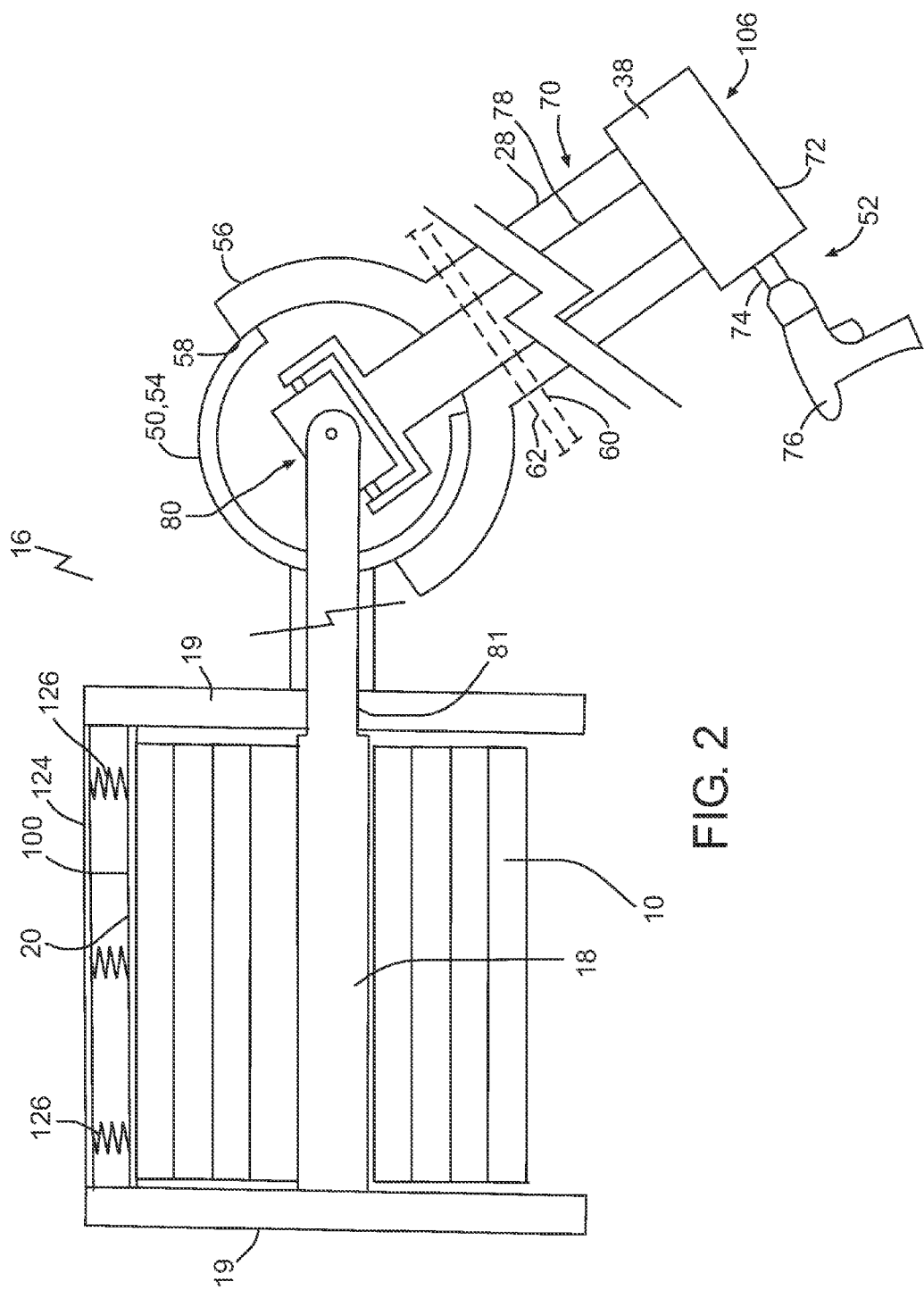
FIG. 2 is a side elevation view, partially in section, of an embodiment of a conductor cover applicator with an articulating head and a spool drive system.
Figure 5:
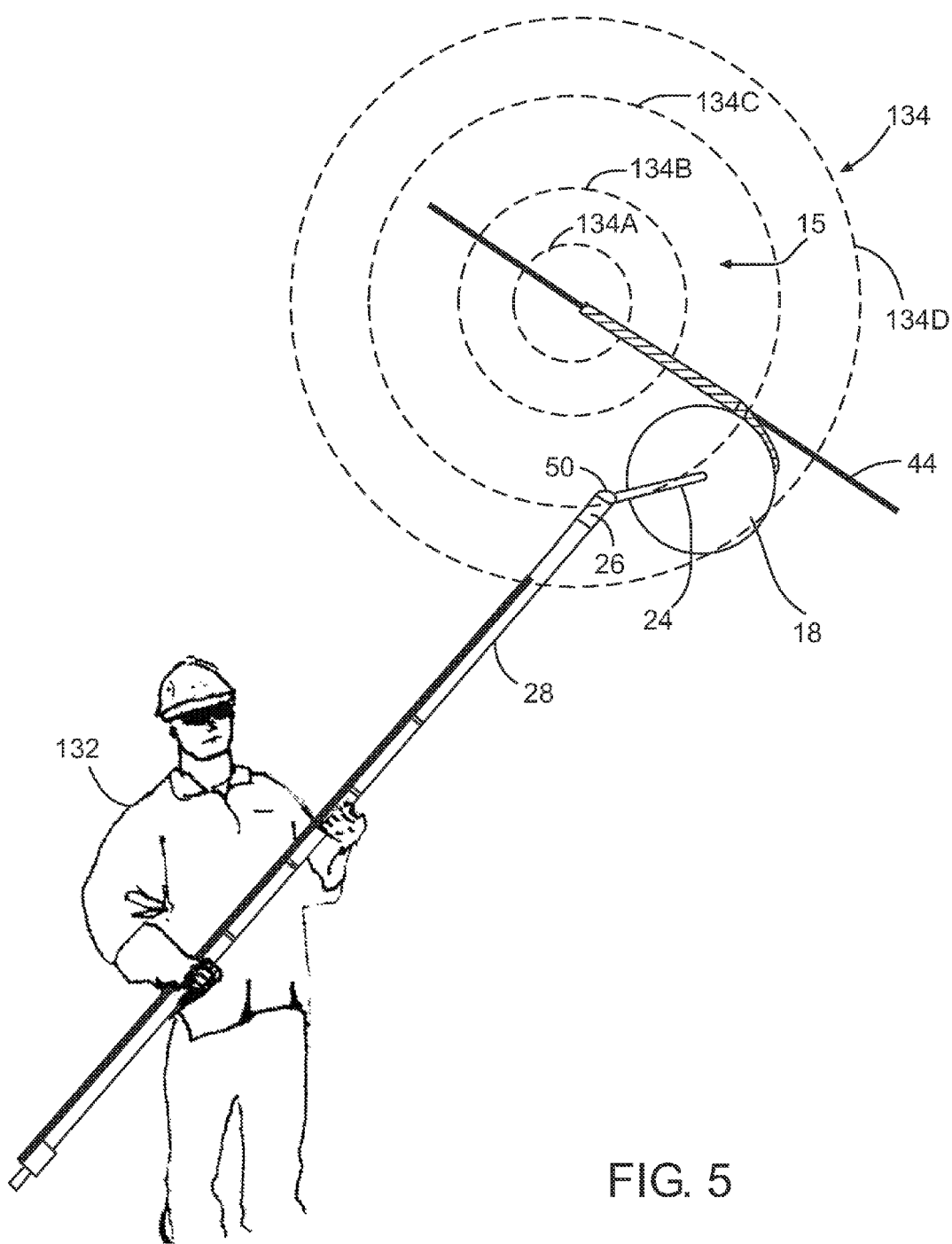
FIG. 5 is a perspective view of a method of installing conductor cover applicator on an energized system from a safe Limit of Approach.
Figure 6:
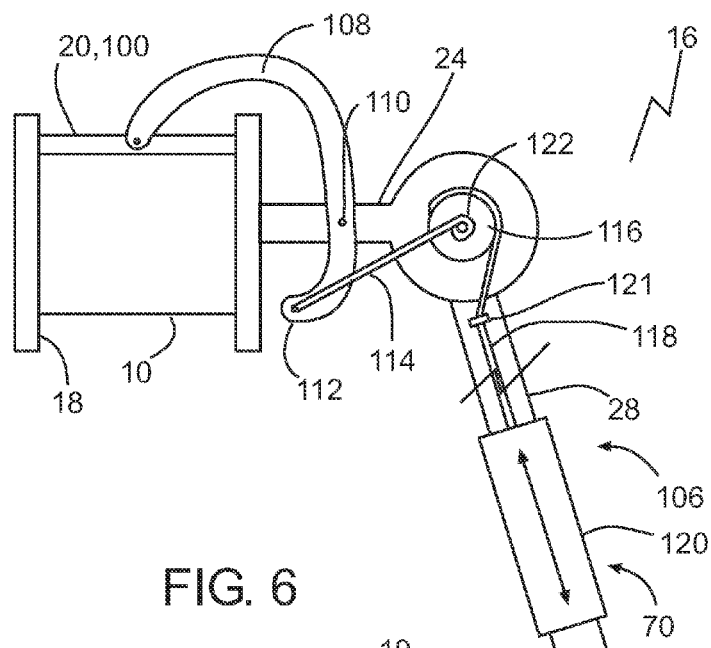
FIG. 6 is a side elevation view of an embodiment of a conductor cover applicator with an actuator operable from a user end of a hot stick.

Spool 18 may be connected to articulate relative to the hot stick 28 (FIGS. 1 and 5). Articulation may be achieved by suitable mechanisms such as a ball joint 50 between the spool 18 and the hot stick 28. The articulation mechanism may be located on hot stick 28 or before the hot stick adapter 26 as shown. The articulation mechanism may have a degree of drag against articulation, in order to prevent the gravitational force of spool 18 alone from causing articulation, but allowing manual force inputted directly or indirectly from a user to adjust the articulation degree of spool 18. An exemplary ball joint 50 is illustrated in FIG. 2, and includes a ball 54 and a corresponding cup 56. Movement of the ball 54 relative to the cup 56 but within the constraints of the cup 56, which has a retaining edge 58 with a smaller diameter 60 than a diameter 62 of the ball 54, allows articulation without removal of the ball 54 from cup 56.

Articulation may be advantageous because it gives the user the flexibility to choose different orientations of spool 18 relative to cable 44. For example, if a user raises the loaded spool 18 over the cover 10 and discovers that articulation is needed because the original orientation of spool 18 to cable 44 is blocked or inaccessible, the user may adjust the articulation angle on the fly using only the hot stick 28 by remotely pushing or pulling the spool 18 against a suitable component of the system until the correct articulation angle is achieved. This also means that the number of positions from which a user can remotely apply cover 10 onto cable 44 from is increased versus a non articulating embodiment. Angular adjustment may also be possible by loosening adapter 26, changing the relative angle between structural element 24 and hot stick adapter 26, and re-tightening the adapter 26, but such a method is more cumbersome because it may take the user a few iterations of adjusting the angle, positioning the spool 18, and adjusting the angle again before the correct application angle is achieved.

Referring to FIGS. 1 and 1A, the spool 18 may be connected to rotate, for example along direction lines 30, relative to the structural element 24. For example, structural element 24 may comprise an axle 32, which may extend partially or fully as shown through spool 18 (FIG. 1A). Axle 32 is illustrated as retaining spool 18 between flange or bolt head 34 of structural element 24 and a nut 36 on axle 32. Such an axle 32 may be provided by a bolt 33 as shown. Other suitable mechanisms of connecting spool 18 for rotation to structural element 24 may be used. For example, the ball joint 50 described above may be adapted to rotate relative to hot stick adapter 26 or hot stick 28. One or more sets of bearings or bushings (not shown) may be used between spool 18 and structural element 24. Spool 18 may be locked from rotation in one direction.

A brake 38 may be provided between the spool 18 and the structural element 24 for partially inhibiting relative rotation. An example of a brake 38 includes nut 36. As shown the brake 38 may also include one or more washers 40 (FIGS. 1 and 1A). By tightening nut 36, the spool 18 is compressed between nut 36 and bolt head 34, and the magnitude of static and kinetic friction between the spool 18 and structural element 24 is increased. The washers 40 may be made of various materials, for example at least one washer 40' may be made of rubber. Nut 36 and bolt 34 also allows the braking degree to be adjusted by tightening or loosening the nut 36. In general, brake 38 may operate by compressing or elongating spool 18 to increase friction. In the example shown, compression is achieved by drawing opposed axial faces 41 and 42 of the bolt head 34 and nut 36, respectively, closer together, so that faces 41 and 42 contact flanges 19, and axial travel of spool 18 along structural element 24 is restricted. However, elongation of spool 18 can be achieved if faces 41 and 42 face away from one another to contact respective surfaces facing one another on spool 18, and faces 41 and 42 are translated apart to stretch the spool 18.

Both elongation and compressive methods and other suitable methods achieve drag upon spool 18 rotation because they increase friction. A certain amount of friction may be beneficial because it may prevent the spool 18 from unraveling by free-wheeling from only the energy stored in the cover 10 after the lock 20 is removed, the cover 10 is in the pre-application state, and no external force, such as from a user, acts upon the spool 18. Stored energy refers to the force imparted by the cover 10 when the cover 10 is forced into an unnatural non tubular conformation such as when wrapped in the pre-application state. This energy attempts to force cover 10 back into its closed, low energy tubular conformation. The stored energy is a function of the natural resiliency of cover 10, with energy increasing with increased resiliency strength. In products such as INSTANT INSULATION™ made by SALISBURY™, this force can be so large that an unrestrained spool 18 will begin to rotate prematurely when lock 20 is removed, leading to premature unraveling and tubular coiling, making application to a cable 44 difficult or impossible (FIG. 4). By imparting drag upon rotation, the spool 18 remains rotationless when the lock 20 is removed and an axial end 27 is engaged on cable 44. Only upon manual translation of, or application of drive force upon, spool 18 does spool 18 begin to rotate. Some adjustment of the drag on rotation may be needed for different types and sizes of covers 10. In one case the drag may be sufficient to prevent the stored cover energy from overcoming the static friction of the brake 38 but small enough to allow the stored cover energy to overcome the kinetic friction of the brake 38. In some cases sufficient resistance is applied in order to prevent the spool 18 from rotating when the spool 18 is stationary relative to the cable 44, but allow the spool 18 to rotate relative to the structural element 24 upon translation of the spool 18 relative to the cable 44. To assist or compensate brake 38, spool 18 may be positioned to press cover 10 up against cable 44 in use, to impart further rotational drag.

Referring to FIG. 2, a drive system 52 may be connected to rotate the spool 18 relative to the hot stick 28. Drive control may be achieved at a user end 70 of hot stick 28 as shown. Drive system 52 may include a gear box 72 with a drill input 74 for connection to a standard drill 76. A drive shaft 78 may transmit rotational energy from user end 70 to spool 18. In the example shown, a universal joint 80 is positioned inside ball joint 50 to allow drive shaft 78 to operate to transmit rotational energy to a spool drive shaft 81, coaxial with structural element 24, across a range of articulation angles. A cardan joint is shown, but a constant velocity or other suitable universal joint may be used. Other suitable drive systems 52 may be used, such as chain and sprocket systems, belt drives, motor systems, pulley systems, ratchet systems, caulking gun-like systems, electromagnetic systems, reciprocating systems, worm gear systems, reel systems, and cable systems. A drive system 52 may also function as a brake 38, as the friction of, or opposing force application from, drive system 52 may oppose free-wheeling from energy stored in cover 10. A battery (not shown) may be used to operate drive system 52. Drive system 52 may be fully or partially integrated within hot stick 28, or may be provided as an add-on to user end 70 of hot stick 28.

Figure 3:
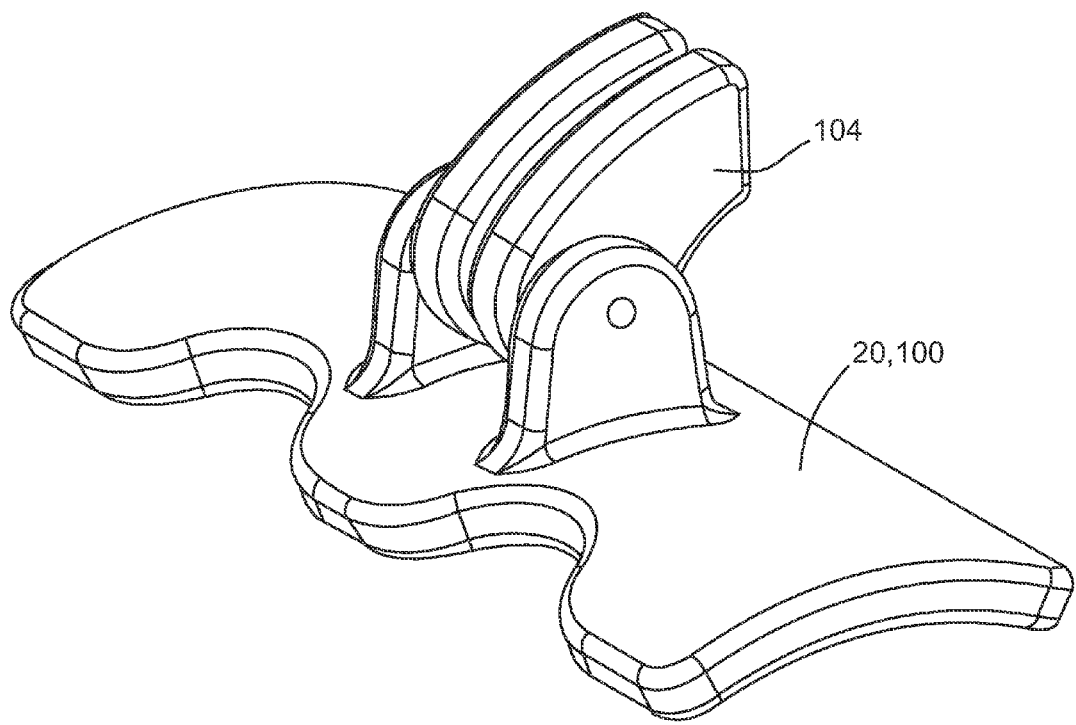
FIG. 3 is a perspective view of a lock gripper plate for a conductor cover applicator.

Referring to FIGS. 1, 3, and 4, lock 20 holds the conductor cover 10 in the pre-application state as shown. In one example the lock 20 comprises a clamp 82 adapted to be independently operated by a hot stick 84 (FIGS. 1 and 4). An exemplary clamp 82 is the Model HS21 nylon blanket clamp made by SALISBURY™. Such a clamp 82 may be operated using a clamp stick hot stick 84 (FIG. 4). A pin 86 retains levers 88A and 88B, which connect to respective jaws 90A and 90B. Pin 86 allows removal of clamp 82 from a user position up to ninety degrees offset from jaw opening 92. A hook 93 on hot stick 84 engages an eyelet 94B or 94A, and upon applying a pulling or pushing force through pin 86, opens jaws 90A and 90B to allow removal of the clamp 82.

Lock 20 may comprise a gripper plate 100 (FIGS. 1 and 3). Gripper plate 100 may have a width 102, parallel to the spool axis 22 in use, sufficient to restrict premature curling of the first longitudinal edge 12 and the second longitudinal edge 14 (FIG. 1). Thus, width 102 may be sized to extend at least from edge 12 to edge 14 when cover 10 is flattened against spool 18 as shown. Gripper plate 100 may be unconnected to lock 20 other than by clamping force by clamp 82, and thus upon removal of lock 20 gripper plate 100 may fall to the ground. In other cases, gripper plate 100 may be adapted to connect to lock 20 or integrally form part of lock 20 (FIG. 3). For example, gripper plate 100 may have a boot end 104 sized to slip on one of jaw ends 96A and 96B of clamp 82 (FIGS. 3 and 4). Boot end 104 may be pivotally connected to gripper plate 100. The other of jaw ends 96A and 96B may come fitted with a rubber boot 98 (FIG. 1).

Use with an independent clamp 82 may require two users to apply cover 10, as one user operates hot stick 28 and another hot stick 84. However, one man operation is possible. Referring to FIGS. 2 and 6, an actuator 106 may connect to operate the lock 20 from a user end 70 of the hot stick 28. In the example shown in FIG. 6, lock 20 comprises a lever arm 108 pivotally attached to structural element 24 and terminating in a gripper plate 100 pivotally attached to lever arm 108. Torque imparted upon an actuator end 112 of lever arm 108, located past pivot point 110, applies or relieves pressure upon gripper plate 100 to lock the cover 10 in place upon spool 18. Actuator 106 includes a first cable 114 connected to a pulley 116, which is operated by a second cable 118 connected at user end 70 to a slide 120. Dielectric cable 118 may be retained along the length of hot stick 28 using a series of hooks 121 or may be contained within hot stick 28. Biasing devices such as springs (not shown) may be positioned between lever 108 and structural element 24 at pivot point 110, and between pulley 116 and structural element 24 at pivot point 122, to ensure that cable tension is maintained through cables 114 and 118. Thus, a user may position the spool 18 in place while applying a downward sliding motion upon slide 120, and then release pressure on slide 120 to release gripper plate 100 to a sufficient degree to begin cover 10 application, and proceed to apply cover 10.

In the example shown in FIG. 2, the drive system 52 may be considered to be actuator 106. In this example flanges 19 form part of structural element 24, upon which spool 18 is mounted for rotation. Lock 20 is mounted on the structural element 24. A top plate 124 of lock 20 is secured to flanges 19, and connected through one or more biasing devices such as springs 126 to a gripper plate 100, which is mounted to slide towards or away from cover 10 relative to flanges 19. The tension of springs 126 may be adjusted depending on application. The tension may be adjusted such that when drive system 52 is not rotating drum or spool 18, there is sufficient friction upon cover 10 to maintain cover 10 in the pre-application state. However, the friction imparted by gripper plate 100 may be small enough that upon imparting drive force through drive system 52 rotation of spool 18 pushes cover 10 past gripper plate 100 to apply cover 10 to a cable. As cover 10 depletes from the spool 18, the springs 126 force gripper plate 100 to travel downwards and maintain contact with cover 10. Although two exemplary actuator 106 systems are disclosed, other suitable actuators 106 may be used to allow remote operation of lock 20.

Referring to FIG. 1, cover 10 may be wrapped around spool 18 such that an exterior surface 128 of the conductor cover 10 faces the spool 18. Thus, as cover 10 unwinds from the spool 18, edges 12 and 14 curl up and away from spool 18, allowing easier application to a cable 44 than if an interior surface 130 of cover 10 faced the spool 18. In other cases interior surface 130 faces spool 18.

Referring to FIGS. 4 and 5, an exemplary method of applying conductor cover 10 to a cable 44 is illustrated. A remote method may be carried out with a hot stick 28 (FIG. 5). In a first stage spool 18 is positioned, by a user 132, adjacent the cable 44. Spool 18 may be articulated to obtain a desirable angle with respect to hot stick 28. An axial end 27 of cover 10 may be extend sufficiently past lock 20 to be positioned over cable 44, such that application through spool 18 will result in edges 12 and 14 of cover 10 properly looping around cable 44 (FIG. 4). In a second stage, the conductor cover 10 is unlocked, for example by removing clamp 82 with hot stick 28. During and after unlocking, cover 10 may be pressed against cable 44 by user 132 to hold cover 10 on spool 18 to prevent free-wheeling on spool 18 that would otherwise cause premature edge curling and removal of cover 10 from spool 18 (FIG. 5). In the example shown in FIG. 4, unlocking is carried out by a second user (not shown) operating pin 86 with hot stick 84 to remove clamp 82. Once unlocked, user 132 applies the conductor cover 10 to the cable 44 by rotating the spool 18 relative to structural element 24 (FIG. 5). Once applied, user 132 may run a hook from a universal switch hot stick or other suitable device longitudinally through the cover 10 to ensure proper folding of edges 12 and 14.

Referring to FIGS. 8 and 9, a further embodiment of an applicator 16 is illustrated as an adapter for use with a shotgun hot stick, also known as a clamp stick 84. The structural element 24 in this case includes a clamp 82 such as a modified version of the Model HS21 nylon blanket clamp discussed above. Lever arm 88B mounts to a work end 91 of hot stick 84, with the eyelet 94B (not shown) retained and controlled by hook 93 (not shown) of hot stick 84 (FIG. 9). Spool body 21 is defined by an axle 95 mounted for rotation to one or more of arms 97 of a structural fork 99 mounted for rotation to clamp 82 (FIG. 8). Conductor cover 10 is illustrated wrapped around axle 95. Axle 95 may extend past one of arms 97 and be connected to a crank 89 for rotating the spool 18 relative to the structural element 24. Crank 89 may be used to load the cover 10 onto the spool body 21, for example by inserting an axial end of cover 10 in a longitudinal slot 23 (FIG. 4) of body 21, and rotating crank 89 while clamp 82 is closed to draw cover 10 onto the body 21. The crank 89 may fold up or be removed from axle 95 so as to give the applicator a lower profile when in use. In some cases, spool body 21 may be connected to a biasing element (not shown), for example connected between axle 95 and one or more of arms 97, to permit storage of rotational potential energy in body 21. For example, crank 89 may be used to rotate and prime the biasing element, so that when clamp 82 is opened to unlock the cover 10, the potential energy is released and body 21 rotates to release the cover 10. In some cases fork 99 need not be mounted on clamp 82, so long as an axle 95 is retained between clamp jaws 90A and 90B and thus able to rotate relative to clamp 82 when unlocked (FIG. 9). Fork 99 may be biased to rotate arms 97 towards jaw 90B of clamp 82 (FIG. 9).

Figure 10:
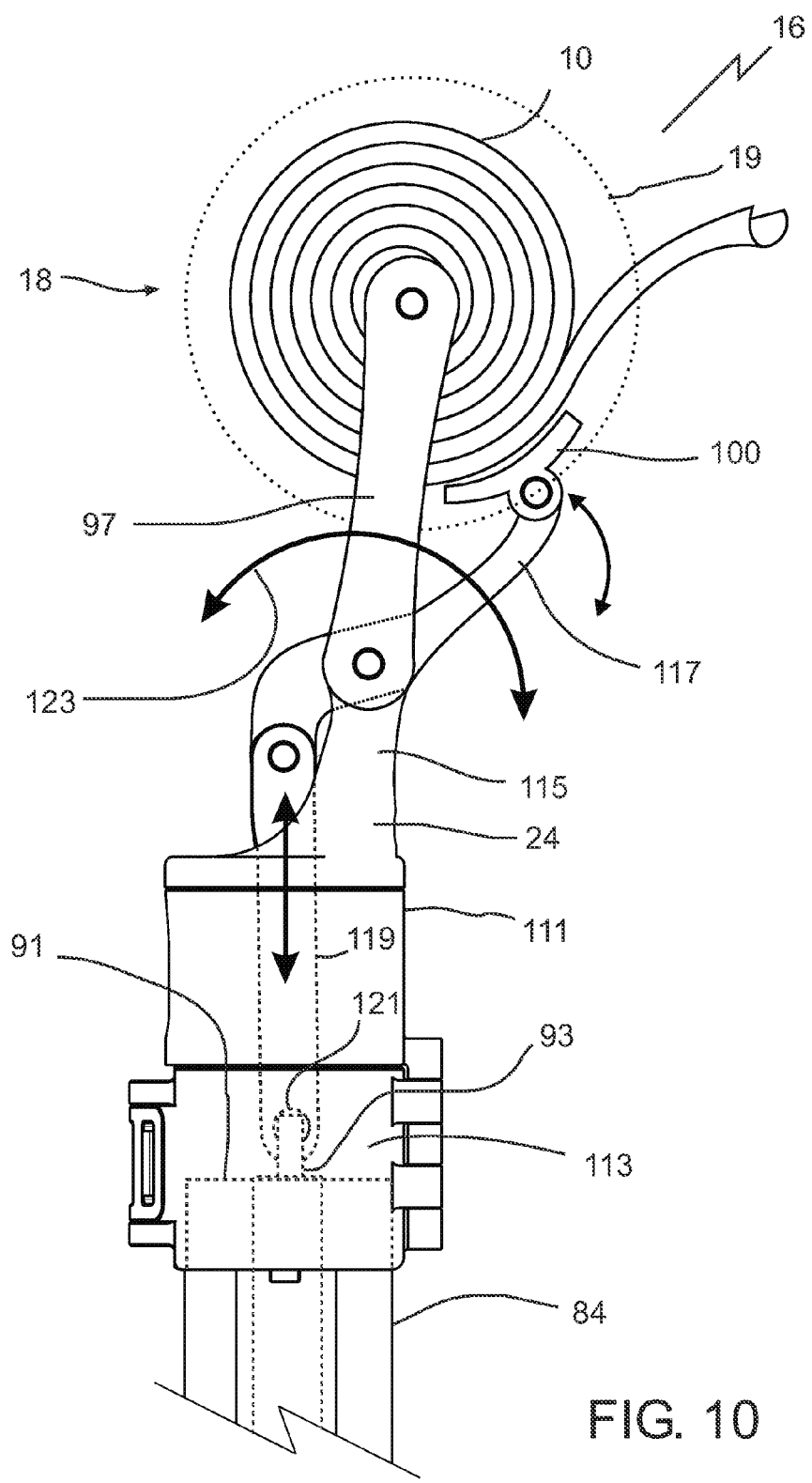
FIG. 10 is a side elevation view of a further embodiment of a conductor cover applicator.

Referring to FIG. 10 a further embodiment is illustrated of an applicator 16 provided as an adapter for a clamp stick 84. Structural element 24 includes a base, such as a collar 111 adapted to mount to work end 91 of hot stick 84. Collar 111 may have a hinged gate 113 that may be opened to permit mounting of collar 111 on work end 91 and then closed to secure the collar 111 to the work end 91. A lever assembly 115 may be mounted on the collar 111, and may pivotally mount an actuator lever arm 117 that is pivotally connected to a lever arm 119 with an eyelet 121 for engagement with hook 93 of hot stick 84. Lever arm 117 pivotally mounts gripper plate 100 against conductor cover 10 that is wrapped around spool 18. One or more arms 97 pivotally extend from lever assembly 115 for supporting spool 18. One arm 97 may be provided on either side of spool 18. Arms 97 may be adjustable in radial position about lever assembly 15 to permit re-positioning of spool 18 relative to collar 111 along the direction line 123. Friction, a lock mechanism, or another suitable mechanism (not shown) may be used to restrict radial adjustment of arms 97 during use to permit a particular position to be maintained after adjustment.

A remote method may be carried out on an energized electrical transmission system 15 (FIG. 5). The spool 18 may be positioned, unlocked, and applied at least partially within a safe Limit of Approach, for example limit of approach 134A, by a user 132 who is outside a safe Limit of Approach, for example Limit of Approach 134D. Standard limits of approach 134 are generally set by the IEEE for live electrical systems. It should be understood that the limits of approach may vary according to region. The limits of approach 134 around energized equipment increase as the voltage increases. In the illustration of FIG. 5, the limits of approach 134 correspond to increasing voltages, and thus increasing radii, from limits of approach 134A-134D. For this purpose, hot stick 28 may be provided in a length that is suitable for the various limits of approach standards in all jurisdictions. In some embodiments, the system 15 comprises non-energized, for example grounded, electrical equipment that is located in close proximity to energized equipment of the energized electrical transmission system, and thus the cable 44 lies within the Limit of Approach of the adjacent energized equipment.

Spool 18 need not be cylindrical and may have other suitable cross sectional shapes such as rectangular. Structural element 24 could be connected directly or indirectly to cable 44 by a device that pulls applicator 16 along cable 44 in use. Structural element 24 may include a handle or be operated without a hot stick 28. Spool body 21 may be sized large enough for one or more flights of flattened cover 10 to sit laterally adjacent one another. Cover 10 may be completely flattened on spool 18 such that cover 10 has a planar tangential shape, or cover 10 may have a non-planar tangential shape on spool 18, if some degree of curving between edges 12 and 14 is permitted. Cover 10 may need cutting to length at some point in the process, and cutting could be accomplished for example using another hot stick independent of hot stick 28, or using a further actuator on hot stick 28. Spool 18 may be provided pre-packed with cover 10 in some cases, or cover 10 may be installed on spool 18 on site. Cover 10 may be installed as a temporary cover. Although a clamp is illustrated in some cases as a lock 20 (FIG. 1), other locks may be used, for example a strap, such as a VELCRO™ strap that may be released using a second hot stick tool such as an alligator clamp.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of applying conductor cover to a cable, the conductor cover being tubular and split longitudinally to define a first longitudinal edge and a second longitudinal edge, the method comprising:
    positioning a spool adjacent the cable, the spool containing conductor cover locked, using a clamp, in a pre-application state where the conductor cover is wrapped one or more times around the spool with the first longitudinal edge and the second longitudinal edge of the conductor cover spread open and perpendicular to a spool axis;
    unlocking the conductor cover;
    applying the conductor cover to the cable by rotating the spool relative to a structural element connected to the spool; and
    in which the structural element comprises or is connected to a first hot stick, and unlocking further comprises removing the clamp with a second hot stick.

2. The method of claim 1 in which the cable is part of an energized electrical power transmission system, and the spool is positioned, unlocked, and applied at least partially within a safe Limit of Approach by a user who is outside the safe Limit of Approach.

3. A method of applying conductor cover to a cable, the conductor cover being tubular and split longitudinally to define a first longitudinal edge and a second longitudinal edge, the method comprising:
    positioning a spool adjacent the cable, the spool containing conductor cover locked in a pre-application state where the conductor cover is wrapped one or more times around the spool with the first longitudinal edge and the second longitudinal edge of the conductor cover spread open and perpendicular to a spool axis;
    unlocking the conductor cover;
    applying the conductor cover to the cable by rotating the spool relative to a structural element connected to the spool, and
    in which the structural element comprises or is connected to a hot stick, and unlocking further comprises unlocking a lock by operating an actuator from a user end of the hot stick.

4. An applicator for applying a conductor cover to a cable, the conductor cover being tubular and split longitudinally to define a first longitudinal edge and a second longitudinal edge, the applicator comprising:
  a structural element, in which the structural element comprises or is connected to a hot stick;
  a spool connected to rotate relative to the structural element, the spool being sized to store the conductor cover in a pre-application state where the conductor cover is wrapped one or more times around the spool with the first longitudinal edge and the second longitudinal edge of the conductor cover spread open and perpendicular to a spool axis;
  a lock for holding the conductor cover in the pre-application state; and
  an actuator connected to operate the lock from a user end of the hot stick.

5. The applicator of claim 4 in which the structural element comprises a hot stick adapter with the hot stick connected to the hot stick adapter.

6. The applicator of claim 5 further comprising a drive system connected to rotate the spool relative to the hot stick.

7. The applicator of claim 5 further comprising a brake between the spool and the structural element for partially inhibiting relative rotation.

8. The applicator of claim 7 in which the brake is adapted to prevent the spool from free-wheeling on only energy stored in the conductor cover when in the pre-application state.

9. The applicator of claim 7 in which the structural element comprises a flanged spool axle, the brake comprises a nut on the flanged spool axle, and the spool is compressed or elongated by the flanged spool axle and the nut.

10. The applicator of claim 5 in which the spool is connected to articulate relative to the hot stick.

11. The applicator of claim 10 further comprising a ball joint between the spool and the hot stick.

12. The applicator of claim 4 in which the structural element comprises the hot stick.

13. The applicator of claim 4 in which the lock is mounted on the structural element.

14. The applicator of claim 4 in which the lock comprises a clamp.

15. The applicator of claim 4 in which the lock comprises a gripper plate with a width, parallel to the spool axis in use, sufficient to restrict premature curling of the first longitudinal edge and the second longitudinal edge.

16. The applicator of claim 4 constructed at least in part with dielectric material.

17. The applicator of claim 4 further comprising conductor cover wrapped around the spool and locked in the pre-application state.

18. The applicator of claim 17 in which an exterior surface of the conductor cover faces the spool.

19. An applicator for applying a conductor cover to a cable, the conductor cover being tubular and split longitudinally to define a first longitudinal edge and a second longitudinal edge, the applicator comprising:
  a spool sized to store the conductor cover in a pre-application state where the conductor cover is wrapped one or more times around the spool with the first longitudinal edge and the second longitudinal edge of the conductor cover spread open and perpendicular to a spool axis;
  a hot stick connected to the spool;
  a lock for holding the conductor cover in the pre-application state; and
  an actuator connected to operate the lock from a user end of the hot stick.

20. An applicator for applying a conductor cover to a cable, the conductor cover being tubular and split longitudinally to define a first longitudinal edge and a second longitudinal edge, the applicator comprising:
  a structural element, in which the structural element comprises or is connected to a hot stick;
  a spool connected to rotate relative to the structural element, the spool being sized to store the conductor cover in a pre-application state where the conductor cover is wrapped one or more times around the spool with the first longitudinal edge and the second longitudinal edge of the conductor cover spread open and perpendicular to a spool axis;
  a lock for holding the conductor cover in the pre-application state; and
  a brake between the spool and the structural element for partially inhibiting relative rotation.

21. The applicator of claim 20 in which the brake is adapted to prevent the spool from free-wheeling on only energy stored in the conductor cover when in the pre-application state.

22. The applicator of claim 20 in which the structural element comprises a flanged spool axle, the brake comprises a nut on the flanged spool axle, and the spool is compressed or elongated by the flanged spool axle and the nut.

23. An applicator for applying a conductor cover to a cable, the conductor cover being tubular and split longitudinally to define a first longitudinal edge and a second longitudinal edge, the applicator comprising:
  a structural element;
  a spool connected to rotate relative to the structural element, the spool being sized to store the conductor cover in a pre-application state where the conductor cover is wrapped one or more times around the spool with the first longitudinal edge and the second longitudinal edge of the conductor cover spread open and perpendicular to a spool axis;
  a lock for holding the conductor cover in the pre-application state; and
  in which the lock comprises a clamp adapted to be independently operated by a hot stick.

24. An applicator for applying a conductor cover to a cable, the conductor cover being tubular and split longitudinally to define a first longitudinal edge and a second longitudinal edge, the applicator comprising:
  a structural element;
  a spool connected to rotate relative to the structural element, the spool being sized to store the conductor cover in a pre-application state where the conductor cover is wrapped one or more times around the spool with the first longitudinal edge and the second longitudinal edge of the conductor cover spread open and perpendicular to a spool axis;
  a lock for holding the conductor cover in the pre-application state; and
  in which the lock comprises a gripper plate with a width, parallel to the spool axis in use, sufficient to restrict premature curling of the first longitudinal edge and the second longitudinal edge.

* * * * *